United States Patent
Liu

(10) Patent No.: US 7,210,259 B2
(45) Date of Patent: May 1, 2007

(54) FILM HOLDER

(75) Inventor: Kuang Yao Liu, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 204 days.

(21) Appl. No.: 11/048,711

(22) Filed: Feb. 3, 2005

(65) Prior Publication Data

US 2006/0038020 A1 Feb. 23, 2006

(30) Foreign Application Priority Data

Aug. 18, 2004 (TW) .............................. 93124887 A

(51) Int. Cl.
*G09F 1/12* (2006.01)
(52) U.S. Cl. ..................... 40/710; 40/701; 40/705; 40/706; 40/707
(58) Field of Classification Search .............. 40/341, 40/701, 703–710, 781; 206/455, 456; 211/41.13; 352/221, 223, 227
See application file for complete search history.

(56) References Cited

U.S. PATENT DOCUMENTS 3,974,582 A * 8/1976 Jantzen, Jr. ................. 40/710
4,051,487 A * 9/1977 Storch et al. ................. 40/710
4,942,684 A * 7/1990 Oehmichen ................. 40/710
5,073,022 A * 12/1991 Pistor et al. ................. 352/223
5,078,271 A * 1/1992 Bauer ......................... 206/455
5,258,807 A * 11/1993 Reinke ......................... 355/76
5,787,624 A * 8/1998 Gerum ......................... 40/706
6,295,418 B1 * 9/2001 Inaba ......................... 396/324

* cited by examiner

*Primary Examiner*—Robert J. Sandy
*Assistant Examiner*—Ruth C. Rodriguez
(74) *Attorney, Agent, or Firm*—Birch, Stewart, Kolasch & Birch, LLP

(57) ABSTRACT

A film holder includes a base, a cover, and a flattening mechanism. The base has a film panel for receiving a film and a plurality of sliding slots formed at its two opposite sides. The cover is mounted on the base and is slidable on the base in a first direction, and at least one side of the cover is provided with a recess. The flattening mechanism is fit on the recess to flatten the film on the base by the slide of the cover in the first direction after the cover is mounted on the base. The flattening mechanism includes a sliding rod, at least one resilient member, a contact plate, and a plurality of cylindrical parts formed on the bottom of the sliding rod.

5 Claims, 8 Drawing Sheets

FILM HOLDER

This application claims the benefit of the filing date of Taiwan Application Ser. No. 093124887, filed on Aug. 18, 2004, the content of which is incorporated herein by reference.

BACKGROUND OF THE INVENTION (a) Field of the Invention

The invention relates to a film holder and, more particularly, to a film holder having a flattening mechanism capable of flattening the film received in the film holder.

(b) Description of the Related Art

Due to the advancement in scanner technology, the function of scanning films is built in a typical scanner. When a user scans a film by such scanner, the film is usually mounted on a film holder, and then they are together inserted into the scanner to perform scanning. However, since the film is inherently curved with uneven surfaces which may cause the scanned image to be out of focus, it must be pulled flat when placed on the film holder.

FIG. 1 shows a schematic diagram illustrating a conventional film holder, and FIG. 2 shows a partial enlarged view C of FIG. 1. Referring to FIGS. 1 and 2, the film holder includes a base 202 and a cover 203. The cover 203 includes a flexible arm 220 whose front end mounts a rubber contact plate 222.

The operating principle of the conventional film holder is described below. After the cover 203 is pivotally connected to the base 202, the friction effect occurred as the rubber contact plate 222 touching the film F may distort the flexible arm 220 to result in the displacement that allows for pulling the film F flat. Though the conventional design may flatten the film, its disadvantage lies in that the range of the displacement that allows for pulling the film flat is determined by the length of the flexible arm 220. In that case, the displacement is not enough to pull the film flat as the flexible arm 220 is too short; while sufficient friction effect is fail to be provided and the film scanning may be obstructed by the flexible arm 220 as the flexible arm 220 is too long.

Hence, according to the conventional design, the film, particularly with large size, may not be completely flattened to cause the scanned image to be out of focus

BRIEF SUMMARY OF THE INVENTION

In view of the above-mentioned problems, an object of the invention is to provide a film holder that allows for effectively flattening the film placed thereon.

To achieve the above-mentioned object, the film holder includes a base, a cover, and a flattening mechanism. The base has a film panel for receiving a film and a plurality of sliding slots formed at its two opposite sides. The cover is mounted on the base and is slidable on the base in a first direction, and at least one side of the cover is provided with a recess. The flattening mechanism is fit on the recess to flatten the film on the base by the slide of the cover in the first direction after the cover is mounted on the base. The flattening mechanism includes a sliding rod, at least one resilient member, a contact plate, and a plurality of cylindrical parts formed on the bottom of the sliding rod. The sliding rod is slidable in a second direction perpendicular to the first direction, and the resilient member is placed between the sliding rod and an outer side of the recess to confine the sliding rod to the inner side of the sliding slot. The contact plate is mounted on the bottom of the sliding rod to touch the film after the cover is mounted on the base, and the cylindrical parts are inserted in the sliding slots after the cover is mounted on the base. The inside of the sliding slot is formed as an inclined surface, and the cylindrical parts of the sliding rod are guided by the inclined surface to move in the second direction as soon as the cover slides on the base in the first direction.

BRIEF DESCRIPTION OF THE DRAWINGS

FIG. 8 shows a cross-section cut along 5B—5B line, where the upper portion illustrates the relative positions of the sliding slot and the cylindrical part. FIG. 9 shows a perspective view and three partial enlarged cross-sections.

DETAILED DESCRIPTION OF THE INVENTION

The film holder of the invention will be described with reference to the accompanying drawings.

Figure 1:
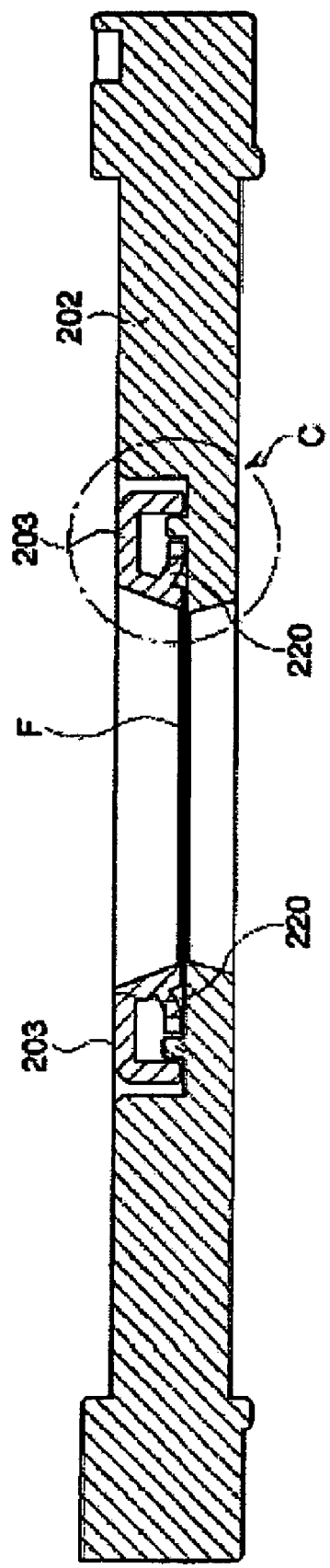
FIG. 1 shows a schematic diagram illustrating a conventional film holder.
Figure 2:
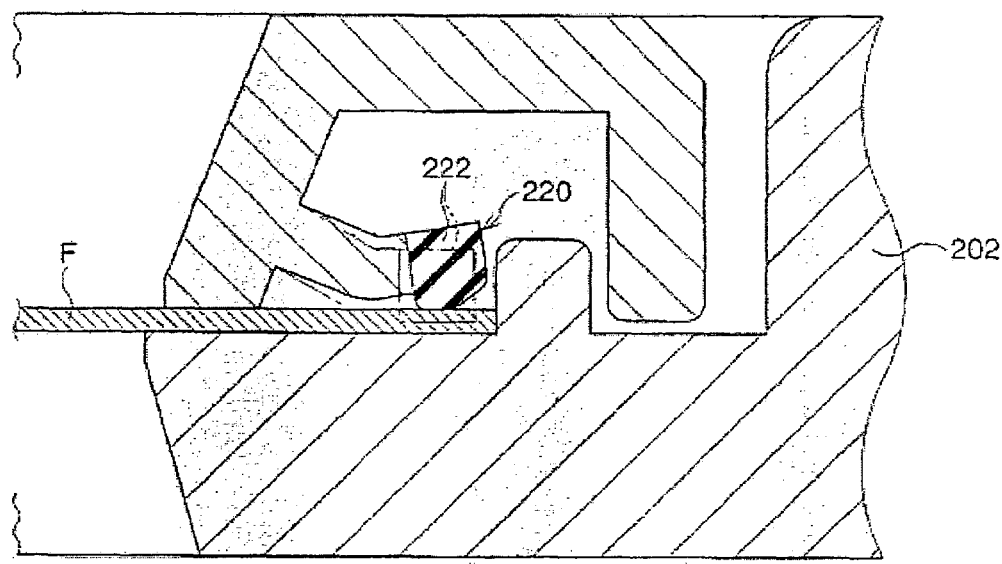
FIG. 2 shows a partial enlarged view C of FIG. 1.
Figure 3:
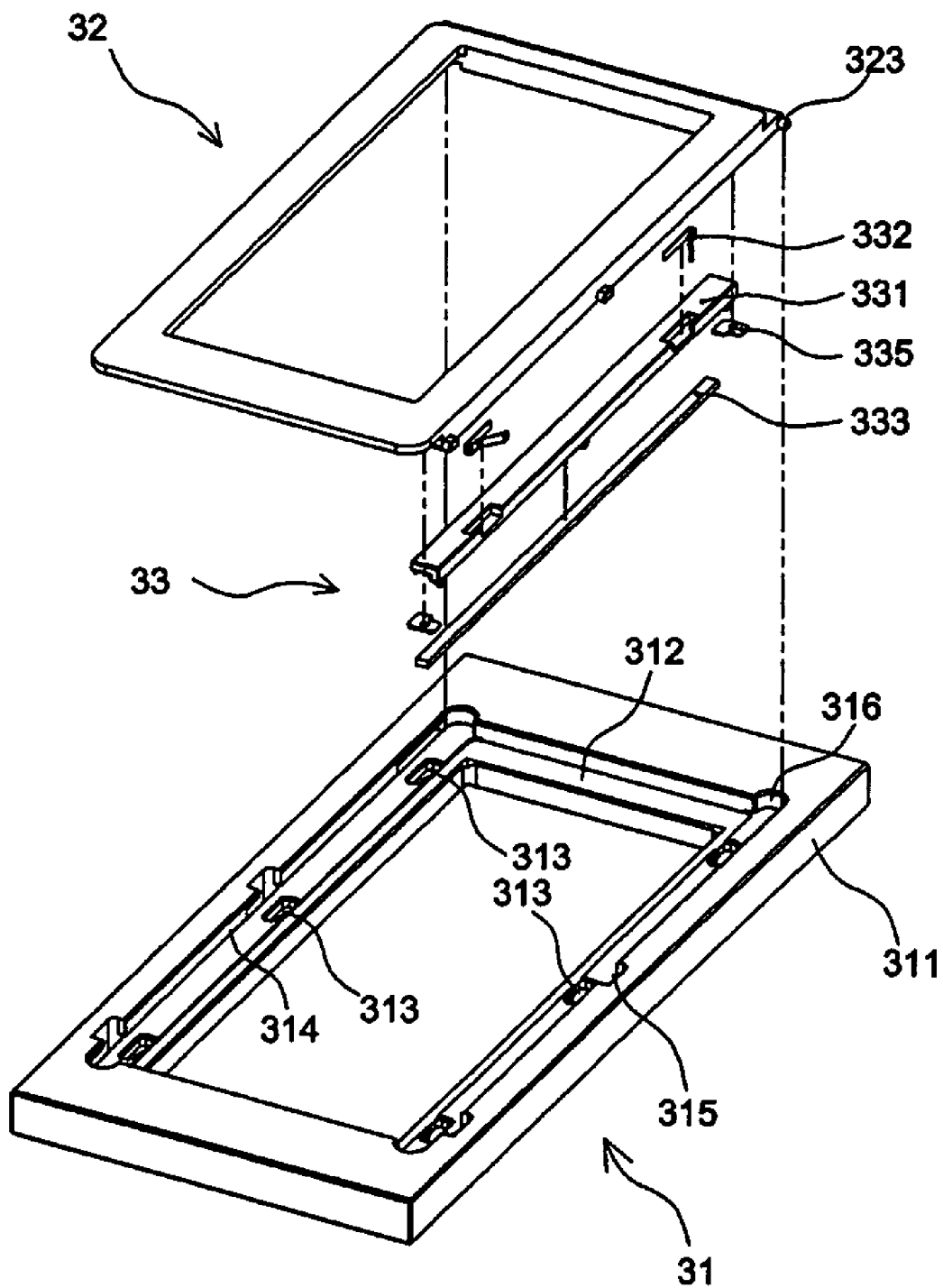
FIG. 3 shows a schematic diagram illustrating a film holder of the invention.

FIG. 3 shows a schematic diagram illustrating a film holder of the invention. Referring to FIG. 3, the film holder includes a base 31, a cover 32, and a flattening mechanism 33 mounted on one side of the cover 32. After the cover 32 and the base 31 are combined together, the cover 32 may slide on the base 31 in a first direction.

The base 31 includes a hollow base casing 311 whose shape conforms to a selected film. The base casing 311 is provided with a film panel 312 in approximate central location to receive a film to be scanned. At least one side of the base casing 311 is provided with a plurality of sliding slots 313 having inclined surfaces inside. Further, two opposite sides of the base casing 311 are both provided with guiding slots 314 each having a plurality of notches 315.

Figure 4:
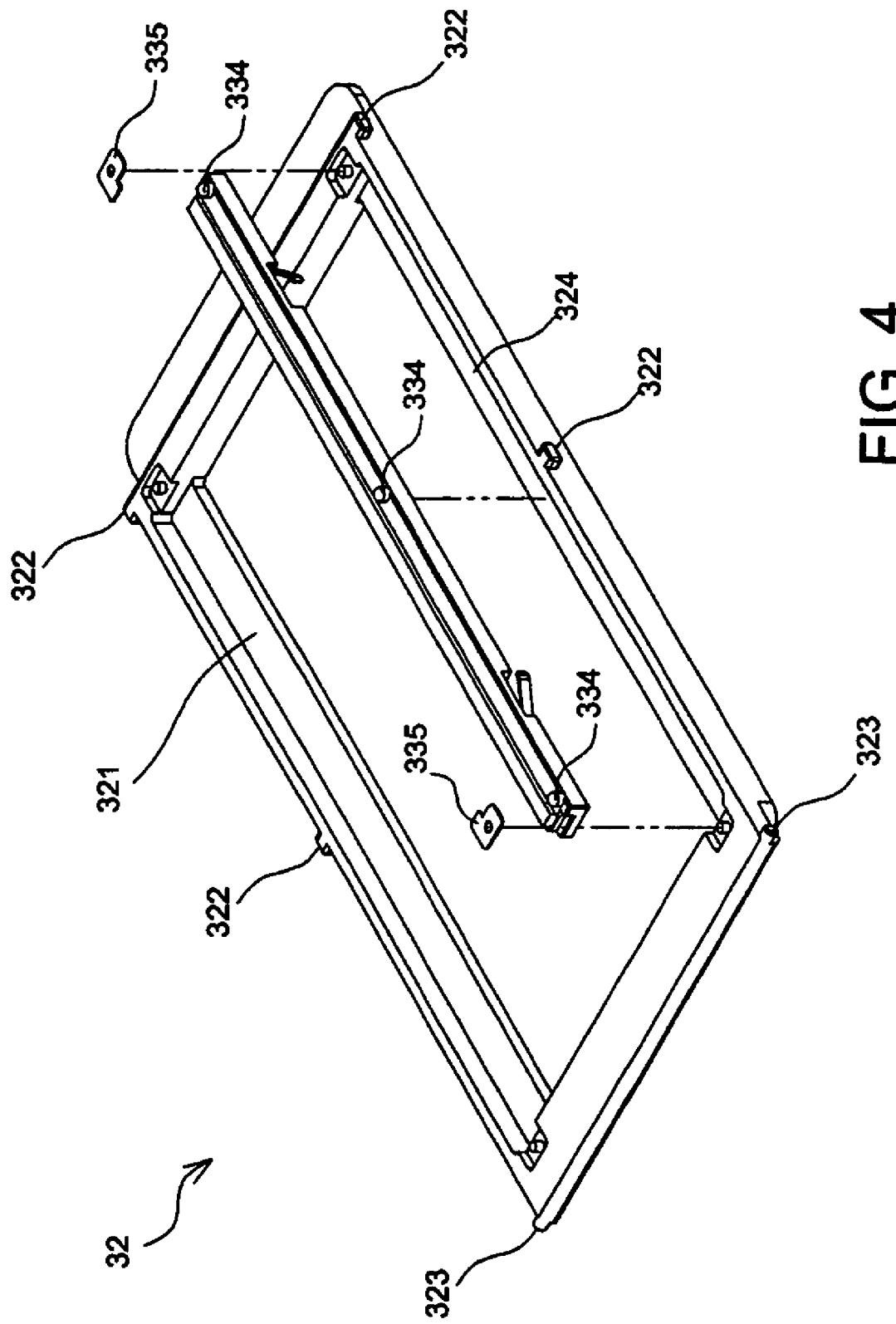
FIG. 4 shows the schematic structures of the cover and the flattening mechanism facing the base.

FIG. 4 shows the schematic structures of the cover 32 and the flattening mechanism 33 facing the base 31. Referring to FIGS. 3 and 4, the cover 32 is provided with a hollow cover casing 321 whose shape corresponds to that of the base casing 311. Two opposite sides of the cover casing 321 are each provided with a plurality of extrusions 322, which are inserted into the notches 315 of the guiding slots 314 as the cover 32 and the base 31 are combined together. Then, a user may move the cover 32 towards the first direction to have the extrusions 322 be inserted in the guiding slot 314, so that the cover 32 is fixed on the base 31 by means of the guiding slot 314. Further, the ends of the two opposite sides of the cover casing 321 is provided with a pair of circular rods 323, so that the cover 32 is pivotally connected to the base 31 after the circular rods 323 fit the holes 316 on one end of the base 31. Also, the two opposite side of the bottom of the cover casing 321 are each provided with a recess 324 for receiving a sliding rod 331.

In this embodiment, though the flattening mechanism 33 is mounted on one side of the upper casing 321, the upper casing 321 may also mount two flattening mechanisms 33 respectively at its opposite sides. The flattening mechanism 33 includes a sliding rod 331, at least one resilient member such as a spring 332, and a contact plate 333 made of rubber. The sliding rod 331 fits the recess 324 on the cover casing 321 by means of a pair of metal plates 335. Because the width of the sliding rod 331 is smaller than that of the recess 324, the sliding rod 331 may move in a second direction inside the recess 324. The spring 332 is placed between the sliding rod 331 and an outer side of the recess 324 of the cover casing 321 to confine the sliding rod 331 to the inner side of the sliding slot 313. Herein, the "inner side" of one part of the film holder is defined as the side that is closer to the center of the film holder, whereas the "outer side" means that side far away from its center. The rubber contact plate 333 is mounted on the bottom of the sliding rod 331 and neighbors the inner side of the sliding slot 313. Once the cover 32 and the base 31 are combined together, the rubber contact plate 333 is in contact with one side of the film. Further, a plurality of cylindrical parts 334 are formed on the outer side of the bottom of the sliding rod 33. Once the cover 32 and the base 31 are combined together, the cylindrical parts 334 are inserted in the sliding slots of the base casing 311.

Figures 5A, 5B:
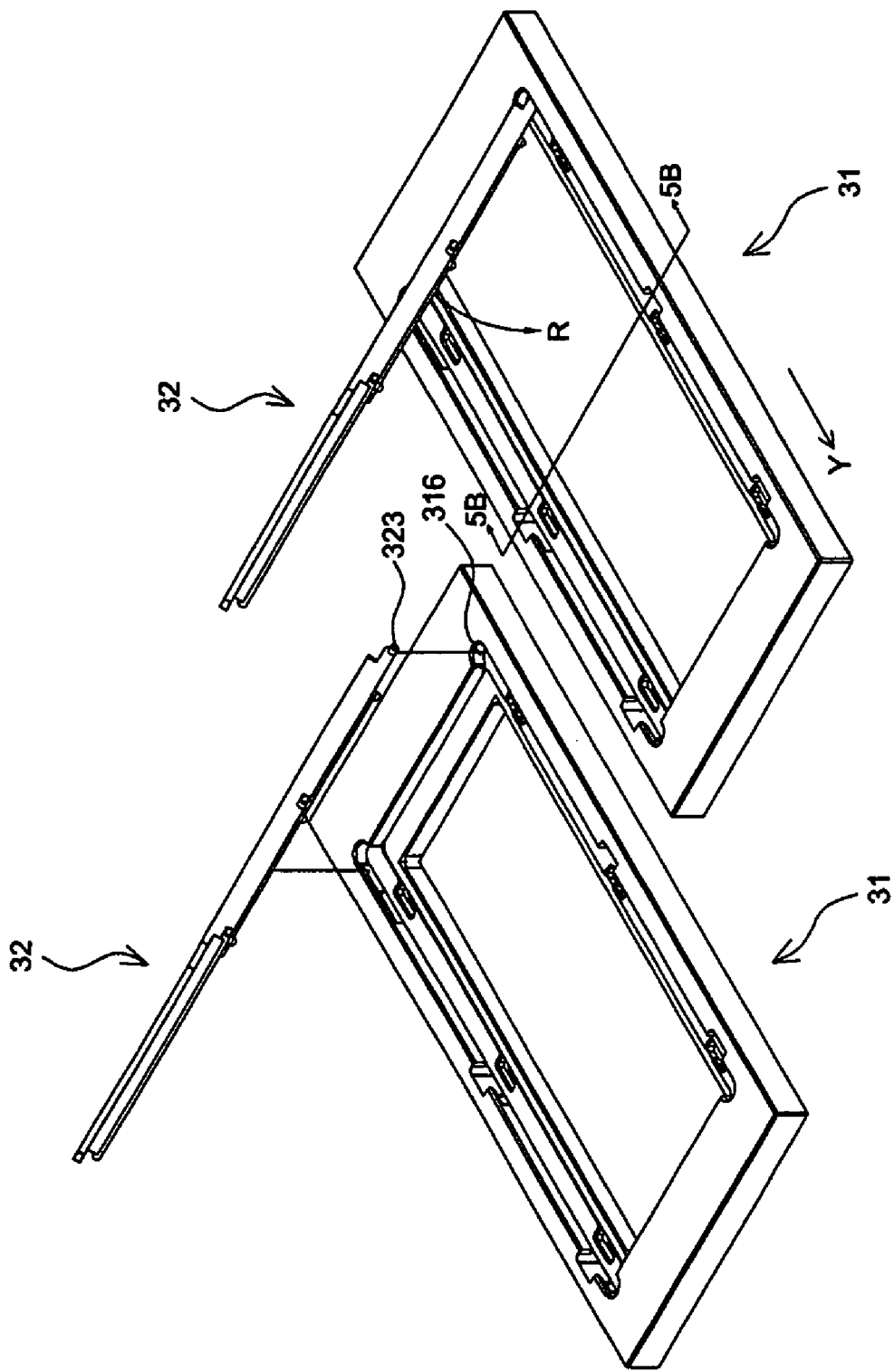
FIGS. 5A and 5B show schematic diagrams illustrating the combination of the cover and the base.

FIGS. 5A and 5B show schematic diagrams illustrating the combination of the cover and the base. Referring to FIG. 5A, the circular rods 323 of the cover 32 are aligned with and then inserted in one end of the base 31 as the cover 32 and the base 31 are to be combined. Referring to FIG. 5B, after the circular rods 323 are inserted in that end of the base 31, an user may open or close the cover 32 to take out or place the film, with the cover 32 being rotated clockwise or counterclockwise as indicated in the direction R.

Figure 6:
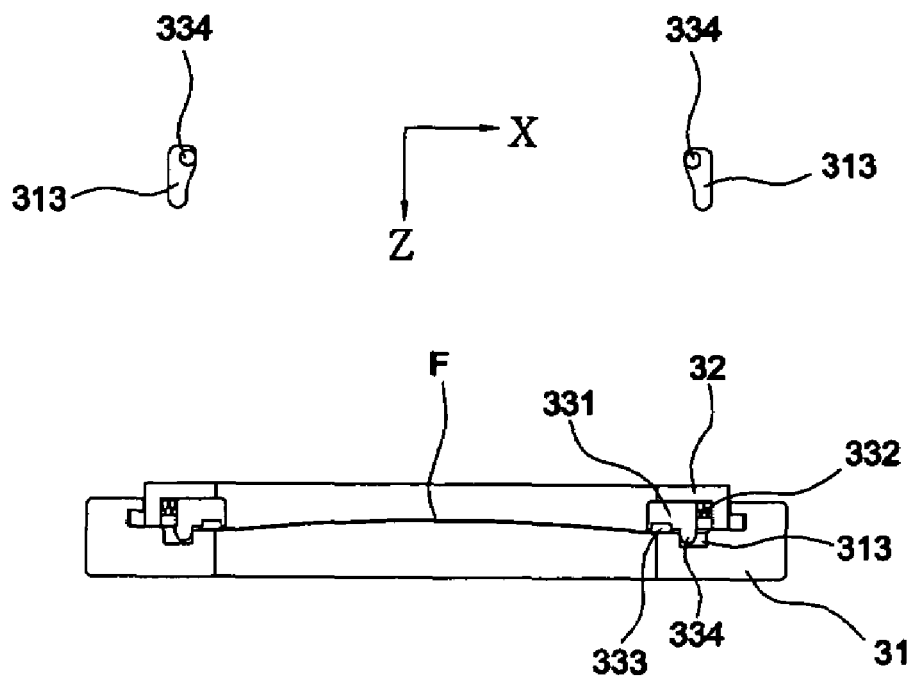
FIG. 6 shows a cross-section cut along 5B—5B line in FIG. 5B, which illustrates the initial stage of the combination between the cover and the base.
Figure 7:
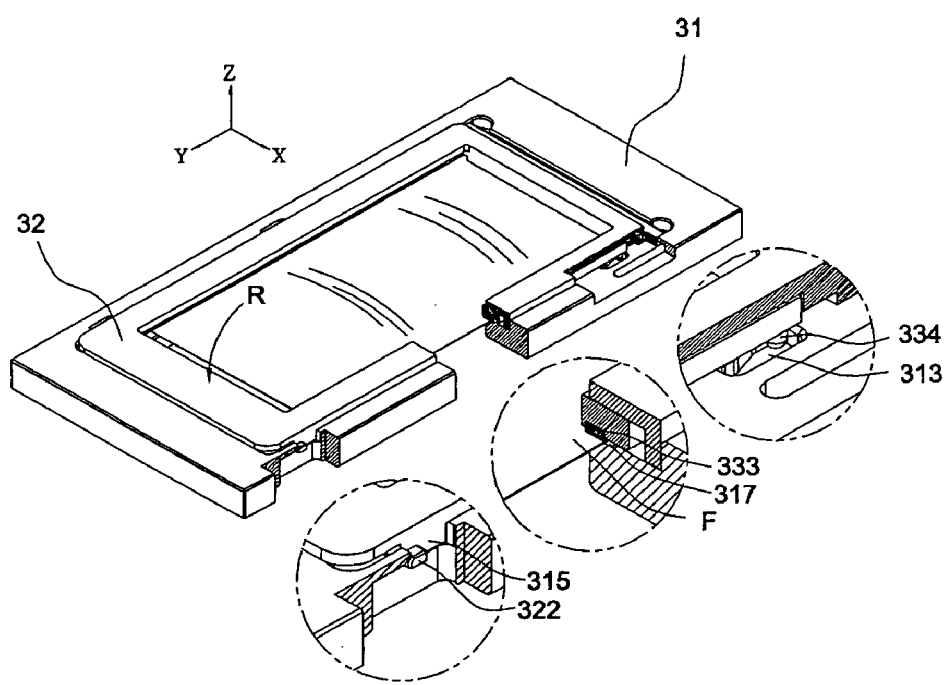
FIG. 7 shows a perspective view and three partial enlarged cross-sections, which illustrate the initial stage of the combination between the cover and the base.

FIG. 6 shows a cross-section cut along 5B—5B line in FIG. 5B, which illustrates the initial stage of the combination between the cover and the base. The upper portion of FIG. 6 depicts the relative positions of the sliding slot 313 and the cylindrical part 334. FIG. 7 shows a perspective view and three partial enlarged cross-sections, which also illustrate the initial stage of the combination between the cover and the base. Referring to the upper portion of FIG. 6, in this embodiment, the inner side of the sliding slot 313 is formed as an inclined surface. As soon as the cover 32 and the base 31 are combined together, the cylindrical part 334 of the sliding rod 331 is confined to the inner side of the sliding slot 313 because of the resilient force of the spring 332. Also, referring to the lower portion of FIG. 6, as soon as the cover 32 and the base 31 are combined together, the film F, with its sides in contact with the rubber contact plate 333, is inherently curved since no external force is applied thereon. Further, referring to FIG. 7, there is a gap 317 between the film F and the base 31 to allow the edge of the film F to move therein as the film F is flattened.

Figure 8:
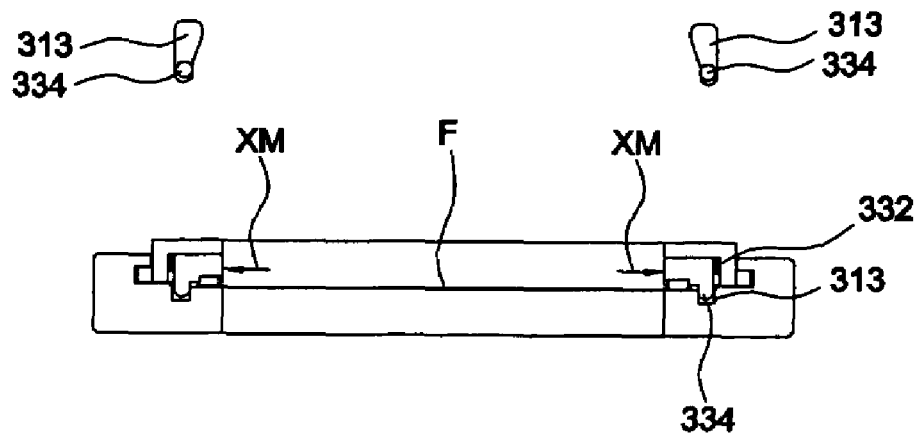
FIGS. 8 and 9 depict the condition that the cover has been moved in the first direction Y.
Figure 9:
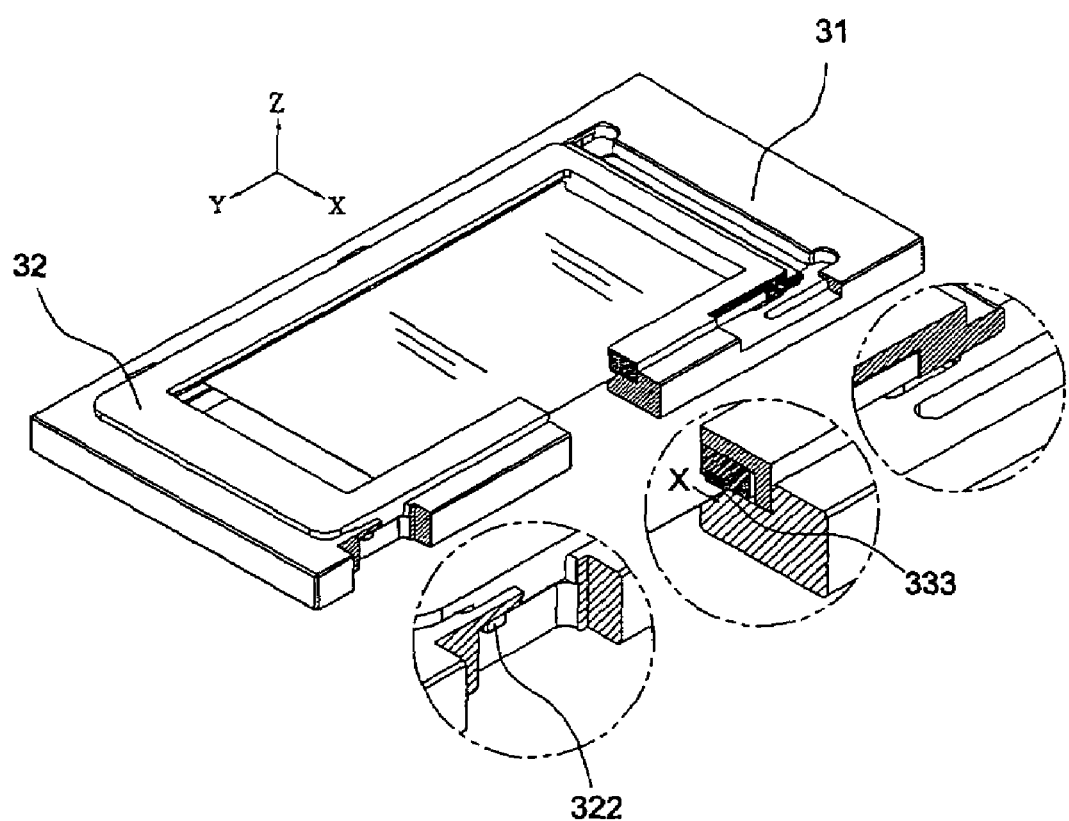

After the cover 32 and the base 31 are combined together, a user may move the cover 32 in the Y direction. FIGS. 8 and 9 depict the condition that the cover 32 has been moved in the first direction Y. FIG. 8 shows a cross-section cut along 5B—5B line in FIG. 5B, where the upper portion illustrates the relative positions of the sliding slot 313 and the cylindrical part 334. FIG. 9 shows a perspective view and three partial enlarged cross-sections.

When the cover 32 moves in the Y direction, the extrusions 322 of the cover 32 may slide inside the guiding slot 314, and the cover 32 is fixed on the base 31 by means of the guiding slot 314. Meanwhile, the cylindrical parts 334 of the sliding rod 331 move in the XM direction along the inner side of the sliding slot 313 to cause the sliding rod 331 to move in the same XM direction. Thereby, since the side of the film F is in contact with the rubber contact plate 333, the outward movement of the sliding rod 331 results in the same outward movement of the rubber contact plate 333 to pull the film F in opposite directions, so that the film F is flattened.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A film holder, comprising:
   a base having a film panel for receiving a film and a plurality of sliding slots formed at its two opposite sides;
   a cover mounted on the base and being slidable on the base in a first direction, at least one side of the cover being provided with a recess; and
   a flattening mechanism fit on the recess to flatten the film on the base by sliding the cover in the first direction after the cover is mounted on the base, wherein the flattening mechanism comprises:
      a sliding rod being slidable in a second direction perpendicular to the first direction;
      at least one resilient member placed between the sliding rod and an outer side of the recess of the cover to confine the sliding rod to an inner side of the sliding slot;
      a contact plate mounted on a bottom of the sliding rod to touch the film after the cover is mounted on the base; and
      a plurality of cylindrical parts formed on the bottom of the sliding rod, the cylindrical parts being inserted in the sliding slots after the cover is mounted on the base;
   wherein the inside of the sliding slot is formed as an inclined surface, and the cylindrical parts of the sliding rod are guided by the inclined surface to move in the second direction as soon as the cover slides on the base in the first direction.

2. The film holder as recited in claim 1, wherein the contact plate is made of rubber.

3. The film holder as recited in claim 1, wherein the resilient member is a spring.

4. The film holder as recited in claim 1, wherein each of the two opposite sides of the base is provided with a guiding slot having a plurality of notches.

5. The film holder as recited in claim 4, wherein each of the two opposite sides of the cover is provided with a plurality of extrusions, and the extrusions are inserted in the notches and are slidable inside the guiding slot as the cover is mounted on the base.

* * * * *